United States Patent [19]
Gaston

[11] Patent Number: 5,267,475
[45] Date of Patent: Dec. 7, 1993

[54] VERTICAL SWEEP LIQUID LEVEL SENSOR

[75] Inventor: Robert D. Gaston, Dearborn Heights, Mich.

[73] Assignee: Ford Motor Company, Dearborn, Mich.

[21] Appl. No.: 35,547

[22] Filed: Mar. 23, 1993

Related U.S. Application Data

[63] Continuation of Ser. No. 898,263, Jun. 15, 1992, abandoned.

[51] Int. Cl.5 .................. G01F 23/68; G01F 23/24
[52] U.S. Cl. .................................. 73/319; 73/313; 338/33; 338/92
[58] Field of Search .............. 73/313, 319, 304 R; 338/33, 92, 94

[56] References Cited

U.S. PATENT DOCUMENTS

| | | | |
|---|---|---|---|
| 3,113,282 | 12/1963 | Coleman | 338/33 |
| 3,494,194 | 2/1970 | Blanchard | 73/308 |
| 4,157,038 | 6/1979 | Yamamoto | 73/313 |
| 4,175,435 | 11/1979 | Hara | 73/313 |
| 4,220,047 | 9/1980 | Mauboussin | 73/313 |
| 4,641,523 | 2/1987 | Andreasson | 73/313 |
| 4,702,107 | 10/1987 | Guerrini et al. | 73/319 |
| 4,779,460 | 10/1988 | Cruickshank | 73/313 |
| 4,827,769 | 5/1989 | Riley et al. | 73/313 |
| 4,845,986 | 7/1989 | Hayashi et al. | 73/290 |
| 4,965,555 | 10/1990 | Huttenberger et al. | 340/624 |
| 5,051,719 | 9/1991 | Gaston et al. | 338/162 |
| 5,129,261 | 7/1992 | Riley | 338/33 |
| 5,138,881 | 8/1992 | Riley et al. | 338/33 |

Primary Examiner—Thomas B. Will
Assistant Examiner—Diego F. F. Gutierrez
Attorney, Agent, or Firm—Roger L. May; Mark L. Mollon

[57] ABSTRACT

A liquid level sensor is disclosed for measuring the amount of fuel remaining in the fuel tank of a motor vehicle. The liquid level sensor comprises a vertically oriented resistor element, a float, and a contact assembly. A conductive strip and a continuous pad resistive strip are both located on the same side of the resistor element. The contact assembly is removably locked in the float, and is movable with the float along the resistor element. A contact connected to the end of a contact arm of the contact assembly is biased against the conductive strip, and another contact is biased against the resistive strip. At any point along the resistor element, the contact assembly electrically connects the conductive strip and the resistive strip to complete a circuit having a resistance proportional to the height of the float to indicate the level of liquid in the vessel.

13 Claims, 4 Drawing Sheets

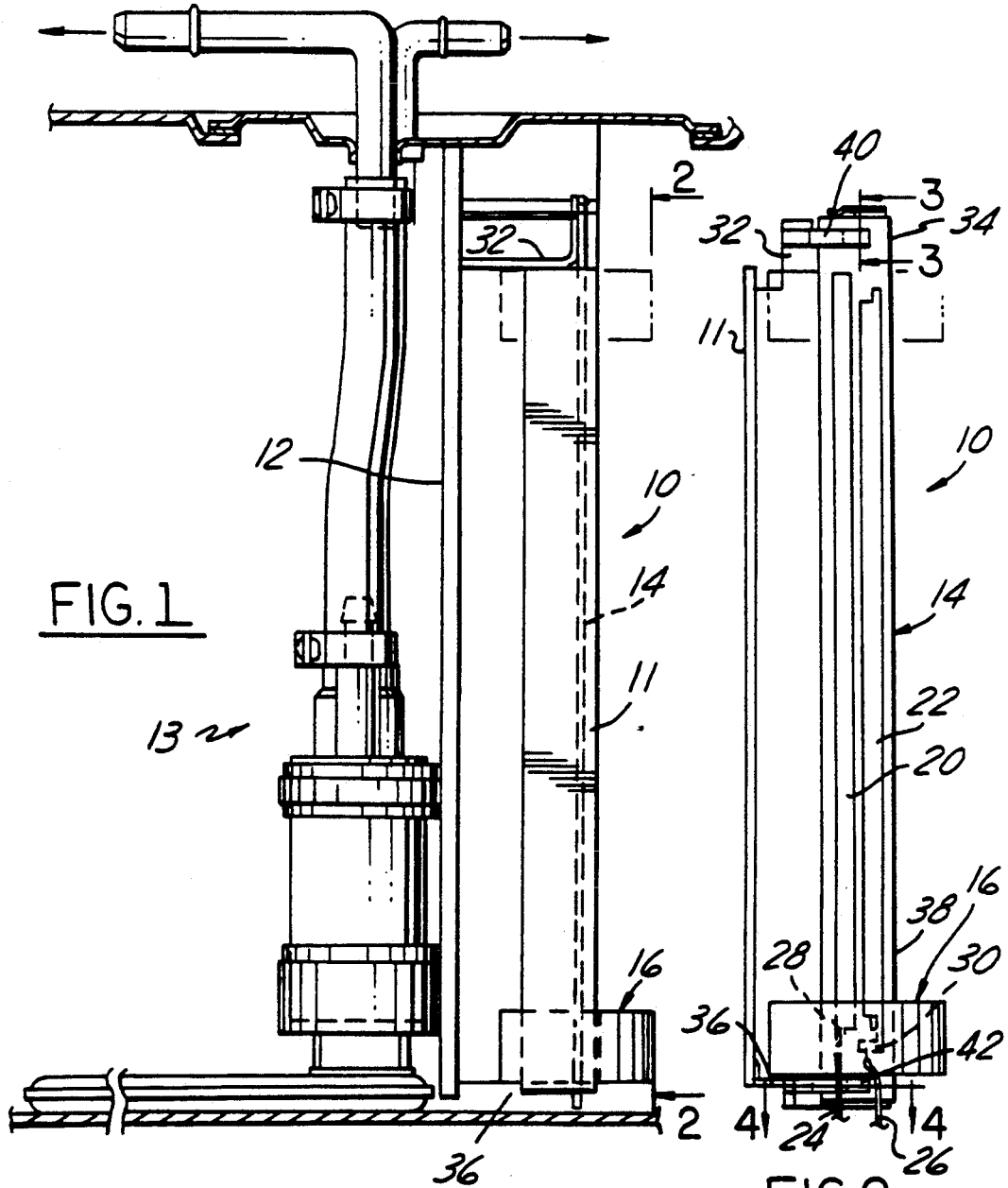
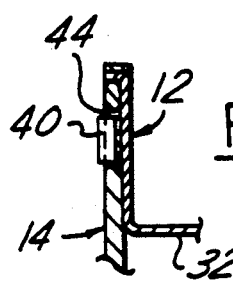
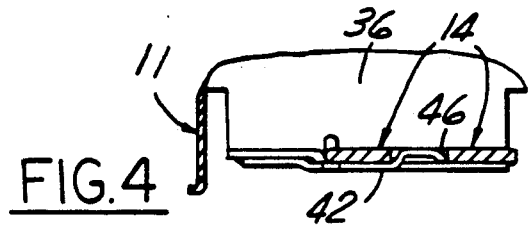

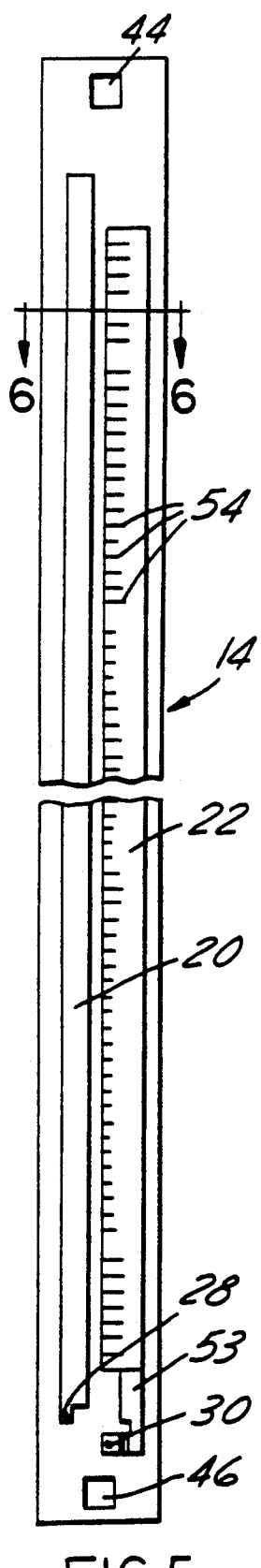
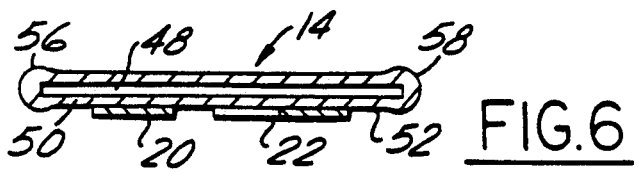
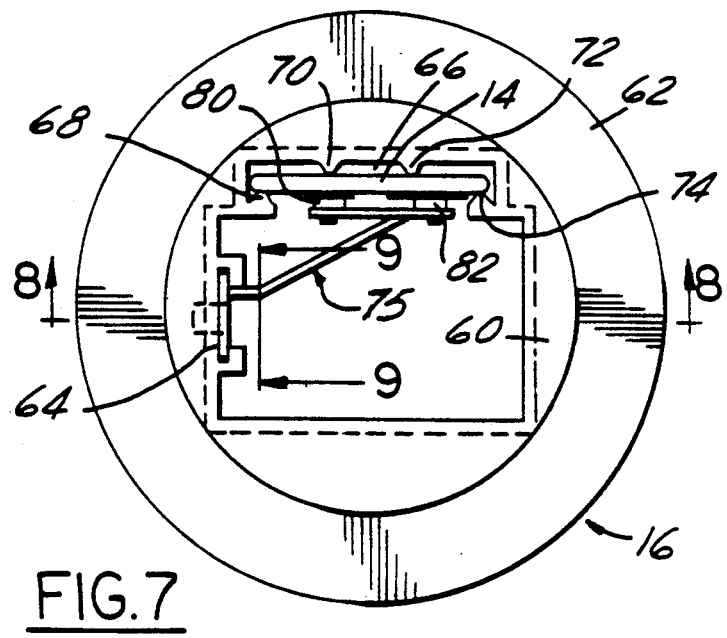
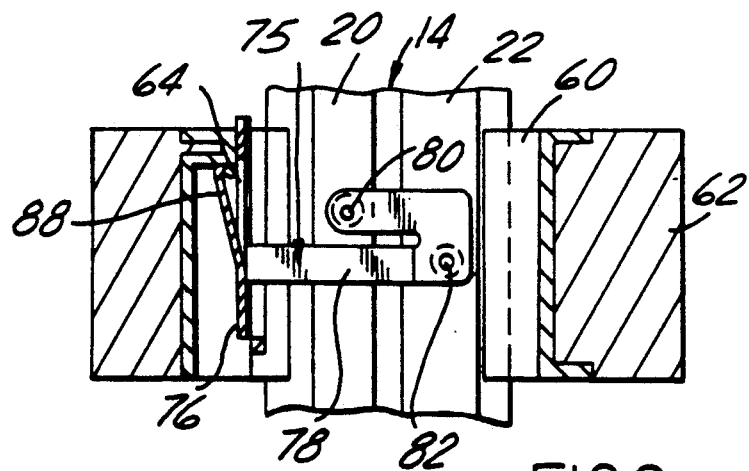
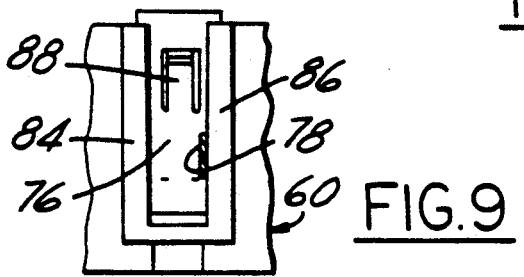

VERTICAL SWEEP LIQUID LEVEL SENSOR

This is a continuation of copending application Ser. No. 07/898,263 filed on Jun. 15, 1992 now abandoned.

TECHNICAL FIELD

This invention relates to liquid level sensors and, more particularly, to a vertically oriented liquid level sensor for a motor vehicle.

BACKGROUND ART

Many devices exist for measuring the amount of liquid remaining in a vessel. In the case of motor vehicle fuel tanks, for instance, fuel level sensing is conventionally accomplished using a float connected to one end of a float arm which travels an angular path as the fuel level varies. The other end of the float arm moves a wiper contact over a resistor. Electrical connections to the wiper contact and the resistor result in a variable measure of resistance as the float moves in accordance with the level of fuel in the tank. A signal resulting from the variable resistance is sent to an indicator, such as a fuel gauge, to indicate to a vehicle operator the amount of fuel present in the tank.

In the design described above, however, the float arm is subject to interference with the walls or other internal structure of the fuel tank. Also, the resolution of the device is low because a relatively large change in the level of the fuel results in only a small movement of the wiper contact over the resistor. This is particularly disadvantageous when the fuel level nears empty. Furthermore, a float arm design may not be readily adaptable in fuel tanks which use an inflatable bladder instead of conventional solid walls.

Liquid level sensors having a float which rides up and down on a vertical member have, therefore, been proposed. For example, U.S. Pat. No. 4,827,769 to Riley et al. discloses a fuel level sensor with a vertical member and a float. A thick film cermet resistive track is deposited on one side of the vertical member, and a conductor is located on the other side of the vertical member. The float is buoyed at the level of fuel in the tank, causing the resistive track to be shorted to the conductor. This completes an electrical circuit in which the resistance is proportional to the level of fuel in the tank. Similar devices are manufactured by VDO Adolf Schindling AG, and include a float that rides up and down on several vertical nickel-chromium wires.

SUMMARY OF THE INVENTION

The present invention is a novel liquid level sensor for measuring the amount of liquid in a vessel. The liquid level sensor comprises a vertically oriented resistor element, a float, and a contact assembly. The resistor element has a conductive strip and a continuous pad resistive strip both located on the same side of the resistor element. The resistive strip is laser trimmed so that the resistance characteristic at each point along the resistive strip is precisely known. The float has a core section disposed about the resistor element and a buoyant section disposed around the core section. The contact assembly is removably locked in a mounting slot in the core section. A contact connected to the end of a contact arm of the contact assembly is biased against the conductive strip, and another contact is biased against the resistive strip. The float is movable along the resistor element between stops as the amount of liquid in the vessel varies. At any point along the resistor element, the contact assembly electrically connects the conductive strip and the resistive strip to complete a circuit having a resistance proportional to the height of the float to indicate the level of liquid in the vessel.

Accordingly, it is an object of the present invention to provide a liquid level sensor of the type described above which is operable in a wide variety of motor vehicle fuel tanks.

Another object of the present invention is to provide a liquid level sensor of the type described above which has an increased fuel gauge resolution.

Another object of the present invention is to provide a liquid level sensor of the type described above in which wear on the resistor element from the contact assembly is minimized.

A more specific object of the present invention is to provide a liquid level sensor of the type described above in which the contact assembly can be quickly and easily slipped into and out of the float.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a side view of a liquid level sensor according to the present invention mounted with a fuel pump assembly for use in the fuel tank of a motor vehicle.

FIG. 2 is a front view of the liquid level sensor taken along line 2—2 in FIG. 1.

FIG. 3 is a cross-sectional view of the liquid level sensor taken along line 3—3 in FIG. 2.

FIG. 4 is a cross-sectional view of the liquid level sensor taken along line 4—4 in FIG. 2.

FIG. 5 is a front view of a resistor element of the liquid level sensor.

FIG. 6 is a cross-sectional view of the resistor element taken along line 6—6 in FIG. 5.

FIG. 7 is a top view of a float and a contact assembly of the liquid level sensor.

FIG. 8 is a cross-sectional view of the float and the contact assembly taken along line 8—8 in FIG. 7.

FIG. 9 is a partial cross-sectional view of the float and the contact assembly taken along line 9—9 in FIG. 7.

BEST MODE FOR CARRYING OUT THE INVENTION

Figure 10:
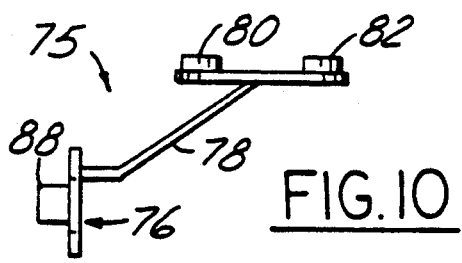
FIG. 10 is a top view of a contact assembly of the liquid level sensor.

With reference to the drawings, the preferred embodiments of the present invention will be described FIGS. 1-2 show a liquid level sensor 10 according to the present invention for measuring the amount of liquid in a vessel. In a preferred embodiment shown and described herein, the liquid level sensor 10 is mounted by elongated brackets 11 and 12 to a fuel pump assembly 13 for use in the fuel tank of a motor vehicle. The liquid level sensor 10 comprises a substantially vertically oriented resistor element 14 and a float 16.

The resistor element 14 includes a conductive strip 20 and a continuous pad resistive strip 22 both located on one side of the resistor element 14. Wires 24 and 26 are electrically connected with a tin silver solder onto conductive solder pads 28 and 30 at the bottom of the conductive and resistive strips 20 and 22, respectively. The solder pads 28 and 30 may be pre-tinned to inhibit oxidation which may occur if water is present in the fuel tank. The wires 24 and 26 connect the strips 20 and 22 to external electrical circuitry, which may include an analog or digital display gauge (not shown).

An extension of the bracket 12 forms a first or upper stop 32 located proximate a first end 34 of the resistor element 14. A similar extension connecting the lower ends of the brackets 11 and 12 provides a second or lower stop 36 located proximate a second end 38 of the resistor element 14. The float 16 is engaged with the resistor element 14, and is movable along the resistor element 14 between the first stop 32 (as shown in phantom) and the second stop 36 as the amount of fuel in the tank varies. The stops 32 and 36 are positioned to correspond respectively to the extreme full and extreme empty conditions of the fuel tank, and provide definite limits to the travel of the float 16 that are accurately repeatable.

FIGS. 3-4 show clips 40 and 42, which each have one of their ends anchored, respectively, to the stops 32 and 36. As shown in FIG. 3, the free end of the upper clip 40 fits into an aperture 44 through the upper end 34 of the resistor element 14 to detachably mount the top of the resistor element 14 to the elongated bracket 12. FIG. 4 shows that the free end of the lower clip 42 likewise fits into an aperture 46 through the lower end 38 of the resistor element 14 to detachably mount the bottom of the resistor element 14, stop 36, and thus to the elongated bracket 11. Together, the clips 40 and 42 allow the resistor element 14 to be snapped into and out of its mounting if servicing is required.

In addition to providing structural support for the resistor element 14, the elongated brackets 11 and 12 reduce the turbulence from fuel sloshing around in the fuel tank to which the float 16 is exposed. It should be appreciated that a tubular sleeve that more fully encompasses the resistor element 14 may be substituted for the elongated mounting brackets 11 and 12.

FIGS. 5-6 show the resistor element 14 including a stainless steel substrate 48 and a porcelain coating 50 deposited on the substrate 48. The conductive strip 20 and the continuous pad resistive strip 22 are both located on the front side 52 of the resistor element 14. The conductive strip 20 is preferably palladium silver and is printed on the porcelain coating 50 by well known means. If the liquid level sensor 10 is to be used in an application where water is present, the palladium silver may be tin coated to inhibit oxidation.

The resistive strip 22 is similarly printed on the porcelain coating 50, and is preferably an ink which includes a glass or silica compound so as to bond more readily with the porcelain coating 50. Resistor inks which are suitable for the resistive strip 22 are available in varying ohms per unit area from DuPont Corporation. An ink with a resistivity characteristic of about 9 to 14 ohms is desirable for the present application. Both the conductive strip 20 and the resistive strip 22 are preferably about 0.010 to 0.015 millimeters thick, while the resistor element 14 is about 1.50 millimeters thick. The resistor element 14 may optionally include a conductive dwell pad 53 located at the bottom of the resistor element 14 and in electrical contact between the resistive strip 22 and the solder pad 30. When the contact assembly rests on the dwell pad 53, as described below, an accurate resistance is measurable. This is particularly desirable when using an analog fuel gauge.

A plurality of laser plunges or trim cuts 54 are arranged on the resistive strip 22 to provide a predetermined resistance characteristic at each point on the resistive strip 22. The resistance value at the bottom of the resistive strip 22 is preferably about 15 ohms, with the resistance value at the top of the resistive strip 22 being about 160 ohms. Any number of laser plunges 54 may be made along the resistive strip 22 by a laser trimming process such as the one described in my U.S. Pat. No. 5,051,719, assigned to the assignee of the present invention. The accuracy of the liquid level sensor 10 increases as the number of laser plunges 54 is increased, but this also increases the time required to complete the resistor element 14. Preferably, the laser plunges 54 are made about every 2-4 ohms.

As shown in FIG. 6, the resistor element 14 has a meniscus at each of its lateral ends. The menisci 56 and 58 are formed by the porcelain coating process, and add about 0.05 millimeters of thickness at the lateral ends of the resistor element 14. The menisci 56 and 58 provide a protuberance about which riders in the float 16 may more easily retain the float against the resistor element 14, as described below.

FIG. 7 shows the float 16 having a core section 60 disposed about the resistor element 14 and a buoyant section 62 disposed around the core section 60. Preferably, the core section 60 is formed of injection molded acetal such as Delrin TM 500 or Celcon TM M90, and the buoyant section 62 is compression molded from a fluoridated polyurethane such as United Technologies SEON E. It should be recognized that the exact shape and buoyancy level of the float 16 can be altered by varying the mold shape and the density of the molding compound, respectively.

The core section 60 has a mounting slot 64 and a guide channel 66. The resistor element 14 is received through the guide channel 66. Riders 68, 70, 72, and 74 project into the guide channel 66 to stably support the float 16 on the resistor element 14. While the riders stabilize the resistor element 14 against front to back movement, side-to-side movement is minimized because the resistor element 14 is disposed in close proximity with the side walls of the guide channel 66 and the riders 68 and 74 rest just over the menisci 56 and 58. Wear on the conductive and resistive strips 20 and 22 due to abrasion from the contact assembly 18 is, therefore, reduced because the float 16 is supported on the resistor element 14 without much play.

FIGS. 8-9 show a contact assembly 75 mounted in the mounting slot 64 of the core section 60. The contact assembly 75 includes a base section 76 and a contact arm 78 connected to the base section 76, with a pair of contacts 80 and 82 connected to the end of the contact arm 78. The base section 76 is retained in the mounting slot 64 by opposite flanges 84 and 86. A detente or spring key 88 on the base section 76 allows the contact assembly 75 to be slipped into and removably locked in the mounting slot 64.

The base section 76 and the contact arm 78 are preferably beryllium copper, and the contacts 80 and 82 are preferably nickel tin. The contacts 80 and 82 may be staked to the contact arm 78 or, alternatively, may be stamped in by a progressive die. In this way, the positive and negative contacts are both mounted on a common carrier, which reduces the electronic noise that might otherwise result from loose joints. When the float 16 abuts the lower stop 36, contact 82 rests on the dwell pad 53 (FIG. 5). Because the resistive strip 22 is a continuous pad rather than a stepped resistor and the contacts 80 and 82 have a relatively low loading on the resistor element 14, small circuit breaks during movement of the contact 82 are avoided. This eliminates spikes and provides a smoother resistance characteristic as the float 16 rides along the resistor element 14.

Figure 12:
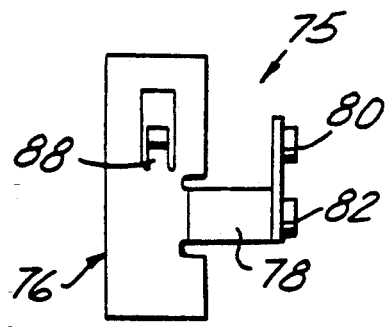
FIG. 12 is a side view of the contact assembly shown in FIGS. 10 and 11.
Figure 11:
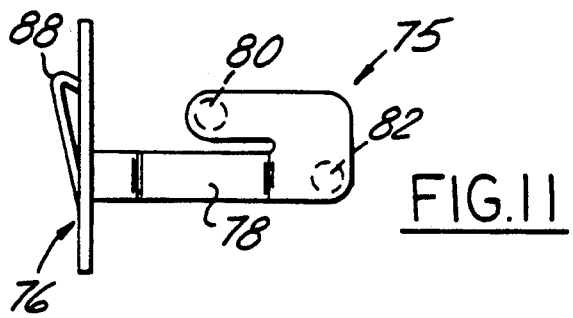
FIG. 11 is a front view of the contact assembly shown in FIG. 10.
Figure 13:
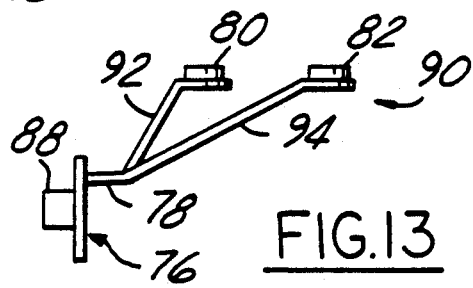
FIG. 13 is a top view of an alternative embodiment of the contact assembly.
Figure 14:
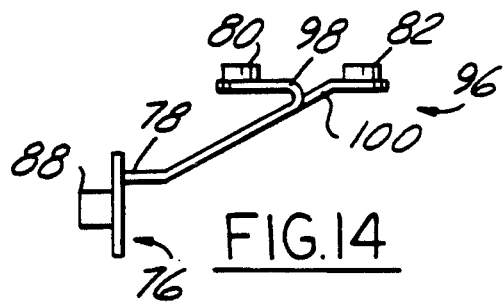
FIG. 14 is a top view of another alternative embodiment of the contact assembly.

FIGS. 10-12 show a preferred embodiment of the contact assembly 75. The contact arm 78 is biased toward the resistor element 14, so that the contacts 80 and 82 are disposed respectively against the conductive strip 20 and the continuous pad resistive strip 22 to complete an electrical circuit with the external electrical circuitry. With the resistor element 14 stable in the guide channel 66, and the base section 76 of the contact assembly 75 stable in the mounting slot 64, the contacts 80 and 82 attain a predictable gram loading on the strips 20 and 22 of about 0.14 to 0.25 Newtons.

The liquid level sensor 10 operates to determine the level of fuel in the fuel tank as follows. Normally, the fuel gauge package includes a five volt power supply which is supplied to the bottom of the resistive strip 22 by the wire 26. As the level of fuel in the fuel tank varies, the float 16 assumes a corresponding height on the resistor element 14. Given a known height to volume relationship for the particular fuel tank in which the liquid level sensor 10 is employed, the resistance in the circuit is directly proportional to the fuel level.

No linearization correction routine, such as might be found in a microprocessor, is necessary. In particular, the linear relationship between the float position and the remaining fuel volume provides greater gauge resolution at low volumes than conventional float arm liquid level sensor designs. Furthermore, because the stops 32 and 36 provide repeatable end points, there is no need for any electronic calibration of the signal generated by the liquid level sensor. As is well known in the art, however, the signal may be electronically corrected for slosh. As one skilled in the art will appreciate from the specification and drawings, the dwell pad 53 provides a dwell pad means located on the first side of the resistor element 14 proximate one end of the resistive strip 22 for providing a point of substantially no electrical resistance from the resistive strip when substantially no liquid remains in the vessel.

Figure 15:
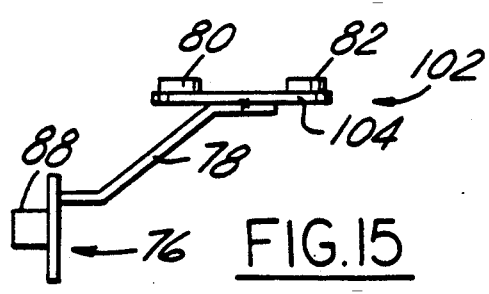
FIG. 15 is a top view of yet another alternative embodiment of the contact assembly.
Figure 17:
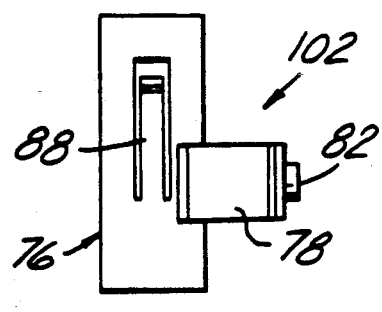
FIG. 17 is a side view of the contact assembly shown in FIG. 15 and 16.
Figure 16:
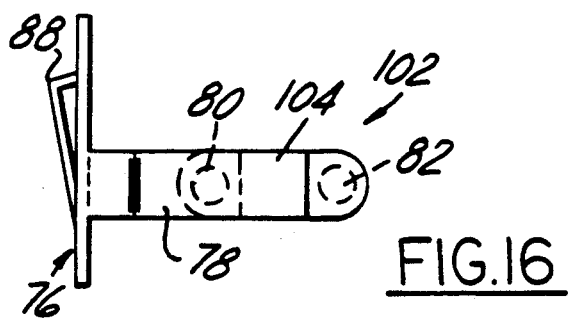
FIG. 16 is a front view of the contact assembly shown in FIG. 15.

FIGS. 13-17 show several alternative preferred embodiments of a contact assembly for use in the liquid level sensor of the present invention. A split-unit forward design 90 shown in FIG. 13 has the contacts 80 and 82 arranged at the ends of separate extensions 92 and 94 extending from the contact arm 78. A split-unit reverse design 96 shown in FIG. 14 has the contacts 80 and 82 connected to similar extensions 98 and 100. FIGS. 15-17 show a single carrier design 102 in which the contacts 80 and 82 are mounted on a carrier arm 104 attached to the contact arm 78. It should be apparent that other variations of the contact assembly design exist which are acceptable for use in the present invention.

Figure 18:
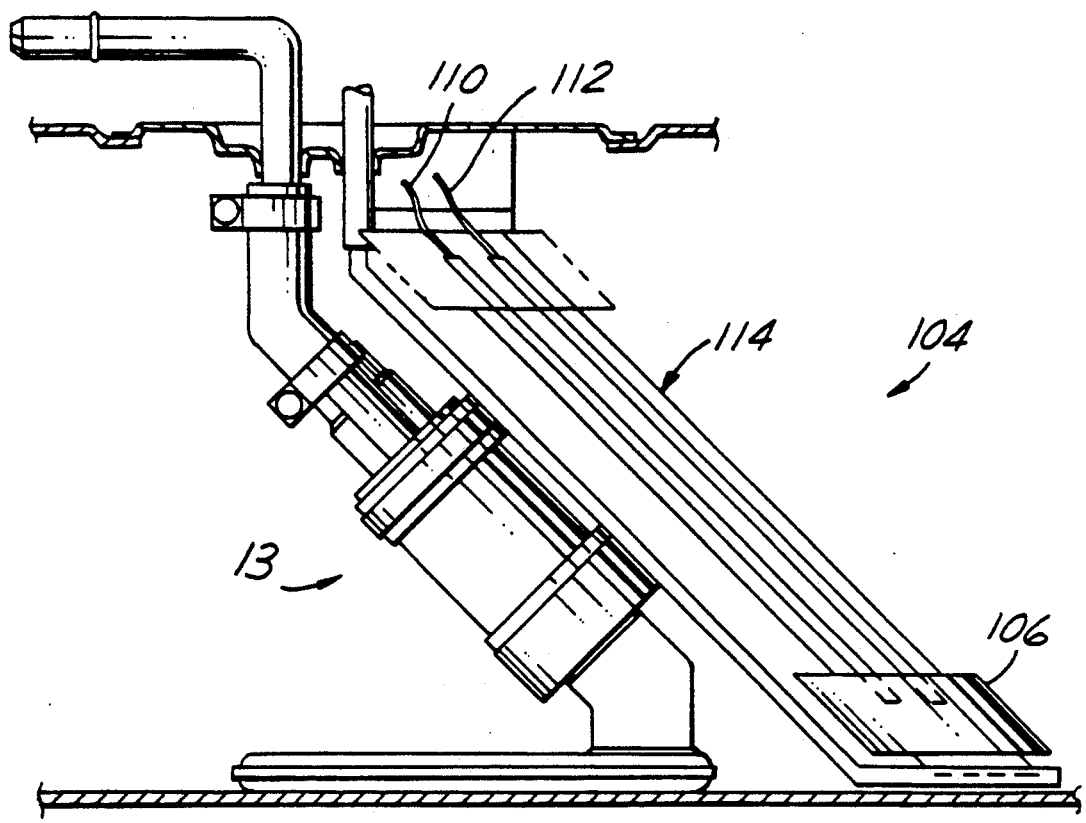
FIG. 18 is a side view of an alternative embodiment of a liquid level sensor according to the present invention mounted with a fuel pump assembly at an angle in the fuel tank of a motor vehicle.
Figure 19:
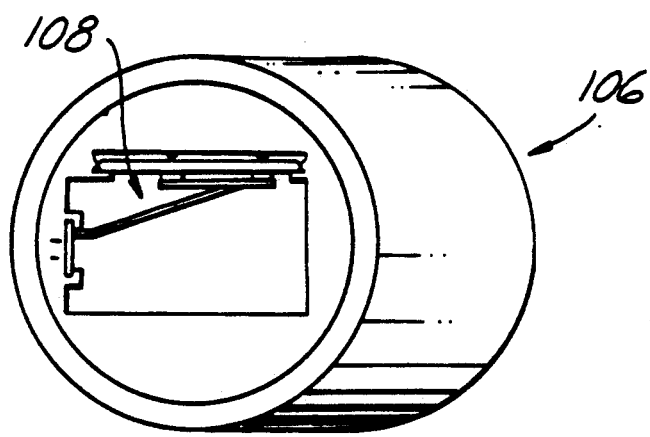
FIG. 19 is a top view of a float and a contact assembly for use with the embodiment of the liquid level sensor shown in FIG. 18.
Figure 20:
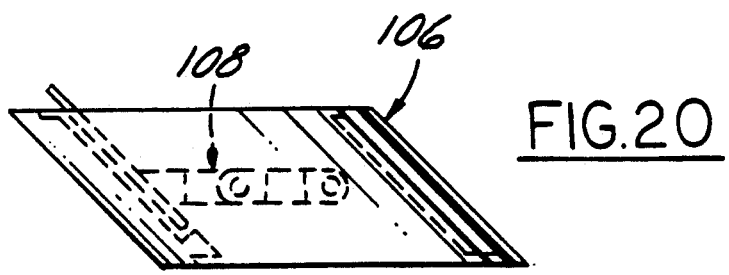
FIG. 20 is a side view of the float and the contact assembly taken along line 20—20 in FIG. 19.

FIGS. 18-20 show an alternative preferred embodiment of a liquid level sensor 104 according to the present invention and adapted for mounting at an angle in the fuel tank. This is desirable, for example, to accommodate shallow fuel tanks. Depending on the available height of the tank, the angle at which the liquid level sensor 104 is mounted preferably varies between 45 and 70 degrees.

A float 106 and a contact assembly 108 for use with the liquid level sensor 104 are shown in FIGS. 19 and 20. The contact assembly 108 is similar to that shown in FIGS. 15-17. As with the float used in the vertically oriented embodiment previously described, the float 106 is movable between a full position shown in phantom in FIG. 18 and an empty position shown in solid line. Wires 110 and 112 arranged at the top of the resistor element 114 are in electrical communication with the fuel gauge (not shown) so that the resistance value measured by the liquid level sensor 104 is inversely proportional to the volume of fuel remaining in the tank.

The liquid level sensor of the present invention may be packaged with the fuel pump assembly, or with a fuel module, in one hole in the vehicle fuel tank. Alternatively, the liquid level sensor may be separately packaged in its own encasement to minimize the effects of sloshing in the tank. Because the liquid level sensor does not have a pivotal float arm that might interfere with the walls or other internal structure of the vehicle fuel tank, it is operable with a wide variety of fuel tanks, including those having inflatable bladders. As one skilled in the art will appreciate, the shape of the float may be varied to accommodate different fuel tanks.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. A liquid level sensor for measuring the amount of liquid in a vessel, the liquid level sensor comprising:
   a resistor element having a first side and a second side;
   a conductive strip located on the first side of the resistor element;
   a resistive strip located on the first side of the resistor element, the conductive and resistive strips being adapted for connection to external electrical circuitry;

a float engaged with the resistor element, the float being movable along the resistor element as the amount of liquid in the vessel varies;

a contact assembly connected to the float, the contact assembly electrically connecting the conductive strip and the resistive strip to complete a circuit with the external electrical circuitry; and dwell pad means located on the first side of the resistor element for providing a point of substantially no electrical resistance from the resistive strip when substantially no liquid remains in the vessel.

2. The liquid level sensor of claim 1 wherein the float has a mounting slot, and the contact assembly is removably locked in the mounting slot.

3. The liquid level sensor of claim 1 wherein the contact assembly comprises a base section, a contact arm connected to the base section, and a pair of contacts being biased against the conductive strip, and the other of the contacts being biased against the resistive strip.

4. The liquid level sensor of claim 1 wherein the float has a guide channel through which the resistor element is received.

5. The liquid level sensor of claim 4 wherein the guide channel has a plurality of riders against which the resistor element abuts for positioning the float on the resistor element.

6. The liquid level sensor of claim 1 wherein the resistor element has a first end, a second end, a first stop proximate the first end, and a second stop proximate the second end, the float being movable between the first stop and the second stop.

7. The liquid level sensor of claim 1 wherein the resistive strip has a plurality of laser plunges arranged thereon to provide a predetermined resistance characteristic along the resistive strip.

8. The liquid level sensor of claim 1 wherein the float comprises a core section and a buoyant section disposed around the core section.

9. The liquid level sensor of claim 1 wherein the resistor element is adapted for substantially vertical orientation.

10. The liquid level sensor of claim 1 wherein the resistive strip is a continuous pad.

11. The liquid level sensor of claim 1 wherein the resistive strip is printed on the first side of the resistor element.

12. The liquid level sensor of claim 1 wherein the dwell pad means comprises a dwell pad proximate one end of the resistive strip.

13. A liquid level sensor for measuring the amount of fuel in a fuel tank of a motor vehicle, the liquid level sensor comprising:

a vertical resistor element having a first side, a second side, a conductive strip located on the first side, a continuous pad resistive strip located on the first side, a first end, a second end, a fist stop proximate the first end, and a second strop proximate the second end, the resistive strip having a plurality of laser plunges arranged thereon to provide predetermined resistance characteristics, the conductive and resistive strips being adapted for connection to external electrical circuitry;

a float having a core section disposed about the resistor element and a buoyant section disposed around the core section, the core section having a mounting slot and a guide channel through which the resistor element is received, the float being movable along the resistor element between the first and second stops as the amount of fuel in the fuel tank varies;

a contact assembly removably locked in the mounting slot, the contact assembly including a base section, a contact arm connected to the base section, and a pair of contacts connected to the contact arm, one of the contacts being biased against the conductive strip, and the other of the contacts being biased against the resistive strip, the contact assembly electrically connecting the conductive strip and the resistive strip to complete a circuit with the external electrical circuitry; and dwell pad means located on the first side of the resistor element proximate one end of the resistive strip for providing a point of substantially no electrical resistance from the resistive strip when substantially no fuel remains in the fuel tank.

* * * * *